United States Patent
Chung et al.

(10) Patent No.: US 7,880,837 B2
(45) Date of Patent: Feb. 1, 2011

(54) BLACK AND WHITE COLOR CHOLESTERIC LIQUID CRYSTAL DISPLAY

(75) Inventors: David B. Chung, Cupertino, CA (US); Daniel J. Lenehan, Los Altos Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/567,958

(22) Filed: Sep. 28, 2009

(65) Prior Publication Data

US 2010/0014038 A1    Jan. 21, 2010

Related U.S. Application Data

(63) Continuation of application No. 11/103,187, filed on Apr. 11, 2005, now Pat. No. 7,595,856, which is a continuation of application No. 10/273,038, filed on Oct. 17, 2002, now Pat. No. 6,909,484.

(51) Int. Cl.
G02F 1/1335    (2006.01)

(52) U.S. Cl. ............... 349/115; 349/73; 349/185

(58) Field of Classification Search .......... 349/73, 349/115, 175, 185
See application file for complete search history.

(56) References Cited

U.S. PATENT DOCUMENTS

| | | | |
|---|---|---|---|
| 5,671,033 A | 9/1997 | Katagiri et al. | |
| 5,905,557 A | 5/1999 | Yaniv | |
| 5,942,154 A | 8/1999 | Kim et al. | |
| 6,169,590 B1 | 1/2001 | Abileah et al. | |
| 6,476,899 B2 | 11/2002 | Ishida et al. | |
| 6,518,944 B1 | 2/2003 | Doane et al. | |
| 6,630,982 B2 | 10/2003 | Li | |
| 6,693,689 B1 | 2/2004 | Kim et al. | |
| 6,844,957 B2 * | 1/2005 | Matsumoto et al. | ......... 359/296 |

(Continued)

FOREIGN PATENT DOCUMENTS

JP    06003706    1/1994

(Continued)

OTHER PUBLICATIONS

Office Action received for German Patent Application No. 103 93 520.7-51, mailed on Aug. 21, 2008, 9 pages.

(Continued)

*Primary Examiner*—Richard H Kim
(74) *Attorney, Agent, or Firm*—John N. Greaves

(57) ABSTRACT

A cholesteric display may be formed, in some embodiments, using a single display element to produce multi-colors for display. A cholesteric material may be sandwiched between a pair of substrates, each associated with pairs of opposed electrodes that are arranged in general transversely to the optical axis of incident light. The first pair of electrodes produce one of two liquid crystal states and result in the reflection of light of a particular wavelength. Light of other wavelengths may be reflected when a second pair (or set) of opposed electrodes, arranged in general transversely, also to the optical axis of incident light, are biased appropriately. So does a third pair (or set) of electrodes. A black and white color display may be generated from a single display element by modulating the pitch length of the cholesteric material within each pairs (or sets).

11 Claims, 3 Drawing Sheets

U.S. PATENT DOCUMENTS 7,295,278 B2 11/2007 Chung

FOREIGN PATENT DOCUMENTS

| | | |
|---|---|---|
| JP | 07181521 | 7/1995 |
| JP | 2002-055365 | 2/2002 |
| WO | 94/10260 | 5/1994 |
| WO | 02/25364 | 3/2002 |
| WO | 2004/036304 A1 | 4/2004 |

OTHER PUBLICATIONS

Li et al., "Electrically Tunable Color (ETC) for Full-Color Reflective Display", Intl. Display Research Conference (IDRC), San Jose, CA, Sep. 25, 2000, pp. 265-268.

Huang et al., "Full Color (4096 Colors) Reflective Cholesteric Liquid Crystal Display", International Display Research Conference, Seoul, Korea, Sep. 28, 1998, pp. 0883-0886.

Office Action received for Japan Patent Application No. 2004-544780, mailed on May 7, 2008, 5 pages.

Summons and Office Action received for German Patent Application No. 103 93 520.7-51, mailed on Jun. 19, 2009, 3 pages.

Office Action received for Great Britain Patent Application No. 0506400.1, mailed on Jun. 27, 2005, 2 pages.

Office Action received for Japan Patent Application No. 2004-544780, mailed on Nov. 10, 2009, 1 page of Japan Office Action and English translation 1 page.

Office Action received for Japan Patent Application No. 2004-544780, mailed on Jan. 6, 2009, 1 page of Japan Office Action and English translation 1 page.

Office Action received for Korea Patent Application No. 10-2005-7006702, mailed on Aug. 30, 2006, 2 pages of Korea Office Action and English translation 2 pages.

Office Action received for Taiwan Patent Application No. 92125962, mailed on Sep. 5, 2006, English translation 1 page.

International Search Report received for PCT Application No. PCT/US03/30585, mailed on Jan. 22, 2004, 5 pages.

International Preliminary Examination Report received for PCT Application No. PCT/US03/30585, mailed on Jun. 15, 2006, 5 pages.

* cited by examiner

BLACK AND WHITE COLOR CHOLESTERIC LIQUID CRYSTAL DISPLAY

CROSS-REFERENCE TO RELATED APPLICATIONS

This application is a continuation of U.S. patent application Ser. No. 11/103,187, filed on Apr. 11, 2005, now U.S. Pat. No. 7,595,856 which is a continuation of U.S. patent application Ser. No. 10/273,038, filed on Oct. 17, 2002, which issued as U.S. Pat. No. 6,909,484.

BACKGROUND

This invention relates generally to liquid crystal displays and particularly to cholesteric displays.

Commonly, liquid crystal material may be modulated to produce a display. Conventional liquid crystal displays commonly use twisted nematic (tn) liquid crystal materials having a pair of states that may differentially pass or reflect incident light. While twisted nematic displays may be reflective or transmissive, cholesteric displays are usually reflective (but they may also be transmissive).

In cholesteric displays, the cholesteric material has very high optical activity. Such liquid crystal material switches between a reflective texture called the planar cholesteric texture and the transparent configuration with the focal conic texture. The cholesteric molecules assume a helical configuration with the helical axis perpendicular to the surface of the substrates.

The cholesteric liquid crystal molecules, in response to an electric field, align as planar texture with the optical axis, reflecting light of a particular wavelength. Generally, the maximum reflection in the planar cholesteric texture is at a wavelength directly proportional to the material's pitch distance.

$$\lambda_0 = n \cdot p \text{ (where } p = \text{pitch length, } n = (n + n^\perp)/2)$$

Conventionally, an electric field is applied in the direction of the optical axis in order to change the phase and the texture of the cholesteric material. However, these changes are generally in the form of the material either being reflective to the spectrum of light of a given wavelength or not reflecting light at all.

Thus, a given completed cholesteric liquid crystal cell may produce reflected light with a specific color, such as red, green or blue, but not any combination of them. Therefore, the conventional approach is to provide separate cholesteric display elements for each of the three primary colors (e.g., red, green and blue). These separate display elements may be stacked up one on top of the other in order to generate the desired full color reflected light output. Alternatively, the three elements may be placed side by side each displaying the same color. The three different colors may be achieved using color filter material.

The use of color filter material substantially reduces the display brightness and increases the overall cost of the display. Similarly, the use of three separate cells in a stack effectively triples the cost of the display. Stacked elements may even reduce the optical brightness of each display pixel.

Bistable reflective cholesteric displays are particularly advantageous for many portable applications. The bistable material is advantageous because it may be placed in one of the two states that have different optical properties. Once placed in either state, the material stays in that state even when power is removed. Thus, a given displayed pixel may remain, without refresh, in a given state until it is desired to change the optical information that is displayed. Being reflective in nature, and hence avoiding the need of backlight plus avoiding the need for refresh will substantially reduce power consumption of the display subsystem.

Thus, there is a need for displays, and particularly for bistable cholesteric displays, that can be fabricated at lower costs.

DETAILED DESCRIPTION

Figure 1:
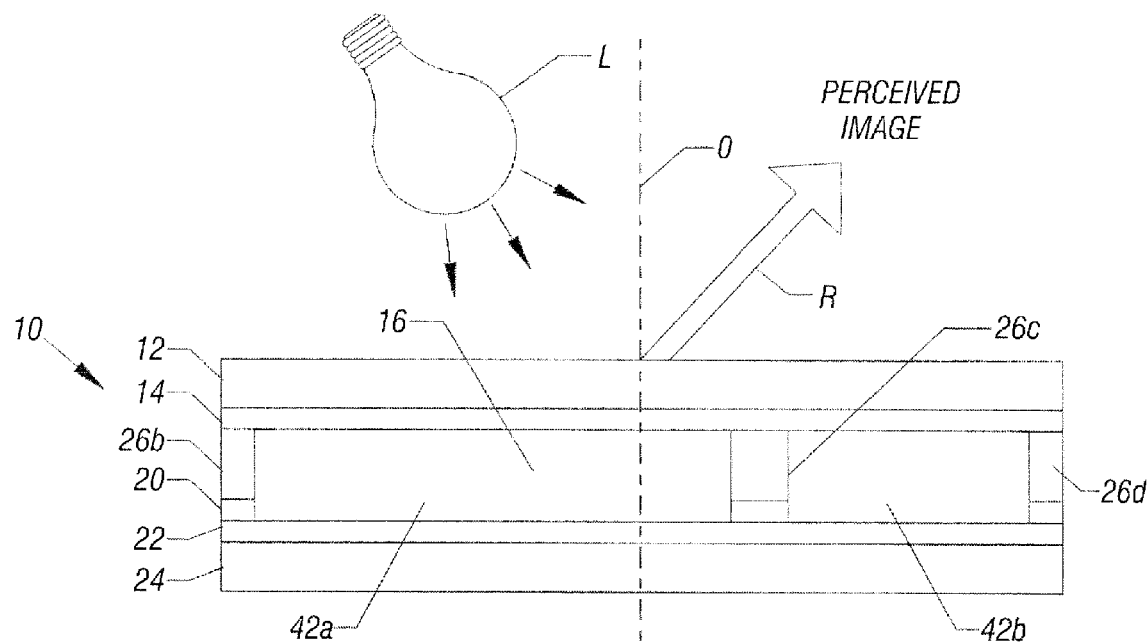
FIG. 1 is a greatly enlarged, schematic cross-sectional view of one embodiment of the present invention.

Referring to FIG. 1, a cholesteric display may include a bistable cholesteric material 16 in one embodiment of the present invention. The material 16 is sandwiched between two substrates 12 and 24. The substrate 24 is advantageously substantially transparent and may conventionally be glass with an absorbing undercoating such as carbon black. The substrate 24 may or may not be transparent. The substrate 24 may be made of a variety of materials. The substrates 12 and 24, in one embodiment, may include transparent electrodes 14 and 22. The transparent electrodes 14 and 22, in one embodiment, may be made of indium tin oxide (ITO).

Sandwiched between the substrates 12 and 24 is a sideways electrode 26b and an opposed sideways electrode 26c which, in turn, is also opposed to a sideways electrode 26d. Between the electrode 26 and the substrate 24 is a material 20. In an active matrix embodiment, the material 20 may be a thin film transistor or other active element to drive the actual display. In a passive matrix embodiment, the material 20 may be a row or column contact or electrode.

Figure 2:
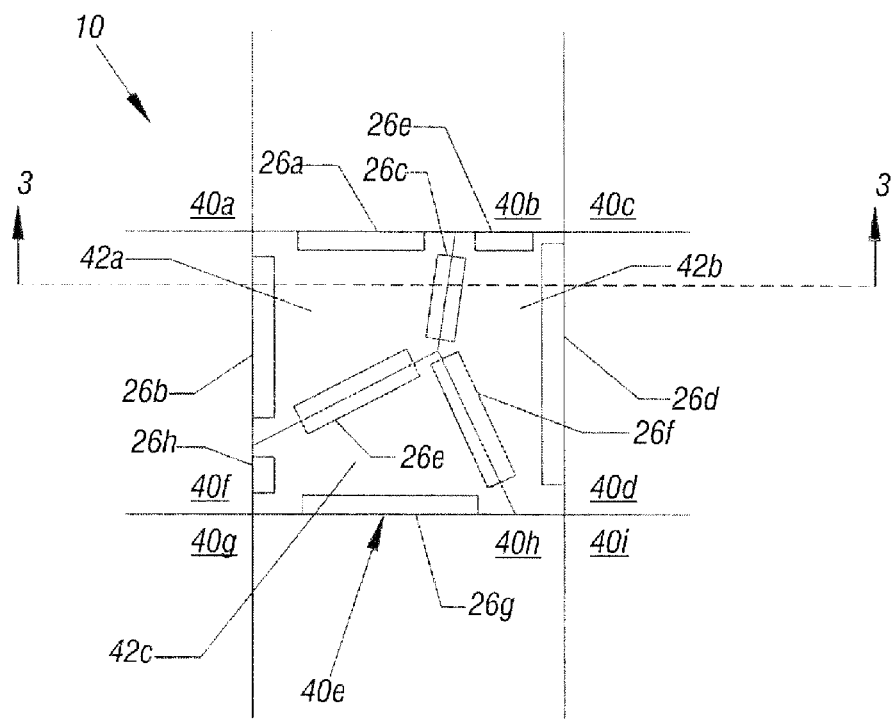
FIG. 2 is a partial, greatly enlarged, top plan view of the structure shown in FIG. 1 in accordance with one embodiment of the present invention.

A display 10, shown in FIG. 2, may be formed out of a plurality of pixels 40 arranged in a grid work array. Each pixel 40, such as a pixel 42, may be divided into three or more subpixels 42a, 42b, and 42c. In one embodiment, each subpixel 42 may be responsible for generating light of a different wavelength. Thus, each pixel 40 may produce three different wavelengths of light, such as red, green, and blue wavelengths.

Each subpixel 42 may include two sets of opposed transverse electrodes 26. For example, the subpixel 42a may have an opposed electrode pair 26b and 26c and an opposed electrode pair 26a and 26e. Thus, the pixel 40e is divided into three subpixels 42 so as to have approximately the same area in each subpixel 42 in one embodiment of the invention. In some cases, the electrodes 26c, 26f, and 26e may be common between two different subpixels. For example, the electrode 26c is an electrode for the subpixel 42a and the subpixel 42b in one embodiment of the present invention.

Figure 3:
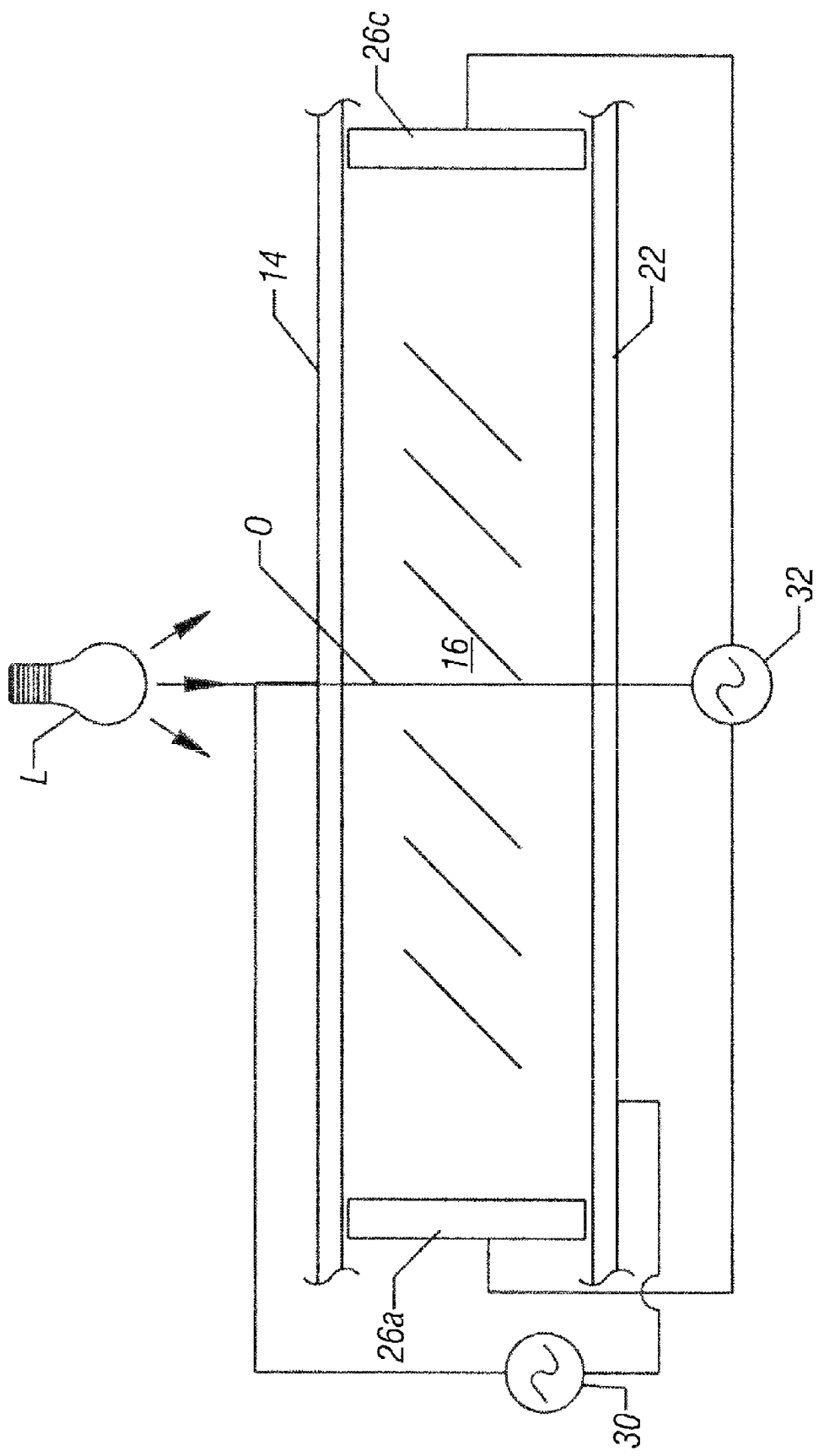
FIG. 3 is a partial schematic depiction of the embodiment shown in FIG. 1.

Referring to FIG. 3, the electrodes 14 and 22 apply an electric field along the optical axis O of the display 10. The optical axis O is aligned with the direction of incident light "L". The light L, directed toward the upper surface of the substrate 12, passes through the upper surface and the electrode 14 and is reflected (or not) by the cholesteric material 16, as indicated by the light beam R, to produce the perceived image. Since the light arrives at and is reflected from the top upper surface, the optical axis O is oriented generally transversely to the substrates 12 and 24.

In conventional fashion, the electric field developed by the electrodes 14 and 22 may cause the bistable cholesteric material 16 to transition between the reflective planar cholesteric texture and the transparent, focal conic texture. The procedures for applying potentials for causing these transitions to occur are well known in the art.

In general, an electric field may be applied by an alternating current voltage source 30 that is electrically coupled to the electrodes 14 and 22. When the cholesteric material 16 is in its transparent texture, in some embodiments, the lower substrate 24 becomes visible. When the material 16 is in its planar cholesteric texture, light of a given wavelength is reflected. That given wavelength is generally determined by the helical pitch of the material 16. In conventional cholesteric displays, this pitch is defined and is fixed. Thus, in conventional cholesteric displays each display element either provides one reflected color or is transparent, displaying the color of the substrate 22.

In accordance with one embodiment of the present invention, the electrodes 26 apply an electric field transversely to the optical axis O. In one embodiment, this transverse electric field may be applied from flat planar electrodes 26 arranged generally transversely to the electrodes 14 and 22.

The electrodes 26 may be coupled to their own separate potential 32. The electrodes 26 need not be, but may be transparent.

The electrodes 26 allow the pitch set by the electrodes 14 and 22 to be varied. In one embodiment of the present invention, the electrodes 26 enable the fixed pitch to be varied between three different pitches. Each of the different pitches, associated with a given potential on the electrodes 26, may produce one of three different light colors. In one embodiment, for example, red, green and blue light may be selectively produced from a single display element 10.

In some embodiments, curved surface electrodes, such as dish-shaped electrodes having axes generally transverse to the optical axis O can be used. The sides of the curved surface of the dish-shaped electrode provides the sideways electric field (from 360°) transverse to the electric field aligned with the optical axis O.

Liquid crystals have dipoles that align in an applied electric field. This property allows an electric field transverse to the optical axis to modify the pitch length of the material.

To generate the black color, the pitches of the material in each pixel 40 may be calibrated to not reflect any visible light and, thus, the pixel 40 becomes dark or black after addressed.

In order to generate light for a black and white display, for example, the helix of the material within each of the subpixels 42 may be appropriately altered to separately produce red, green, and blue light at the same time. The complementary reflectance of these three colors renders a pixel 40 white in color as a whole. Thus, any color may be produced by operating one of the three subpixels 42 and the color white may be produced by operating all of the subpixels 42. Conversely, in one embodiment, when none of the subpixels are reflective, the pixel 40 appears to be dark or black.

The geometry of the subpixels 42 is subject to considerable variation. In general, it is only desirable that the subpixels 42 have similar areas in one embodiment of the present invention.

Through the use of electrodes 26, a multi-colored display pixel may be produced with only a single cholesteric display element. As a result, substantial cost savings may be achieved by avoiding the need for three different display elements that are either laterally displaced from one another or stacked one atop the other. Moreover, when three display elements are utilized in a laterally displaced arrangement, color filter arrays are generally needed and color filter arrays would significantly increase the cost of the display.

In one embodiment of the present invention, the material 16, when exposed to the electric field aligned with the optical axis O, reflects light in a central or intermediate wavelength of approximately 560 nanometers. Then the pitch may be changed using the electric field applied through electrodes 26 to either increase the reflected wavelength, for example to 670 nanometers, or to decrease the reflected wavelength, for example to 450 nanometers. This basically changed the reflected colors of the cell or element.

Other variations may be utilized, as well. In some embodiments it may be efficient to provide the color red or the color blue when the electrodes 26 are not operating and then to tune the pitch to adjust the reflected wavelength upwardly or downwardly using the electrodes 26. A transmissive mode may also be used. In some embodiments, pitch changes may be used to selectively reflect and/or transmit different wavelengths of the spectrum, including those of the infrared range.

Figure 4:
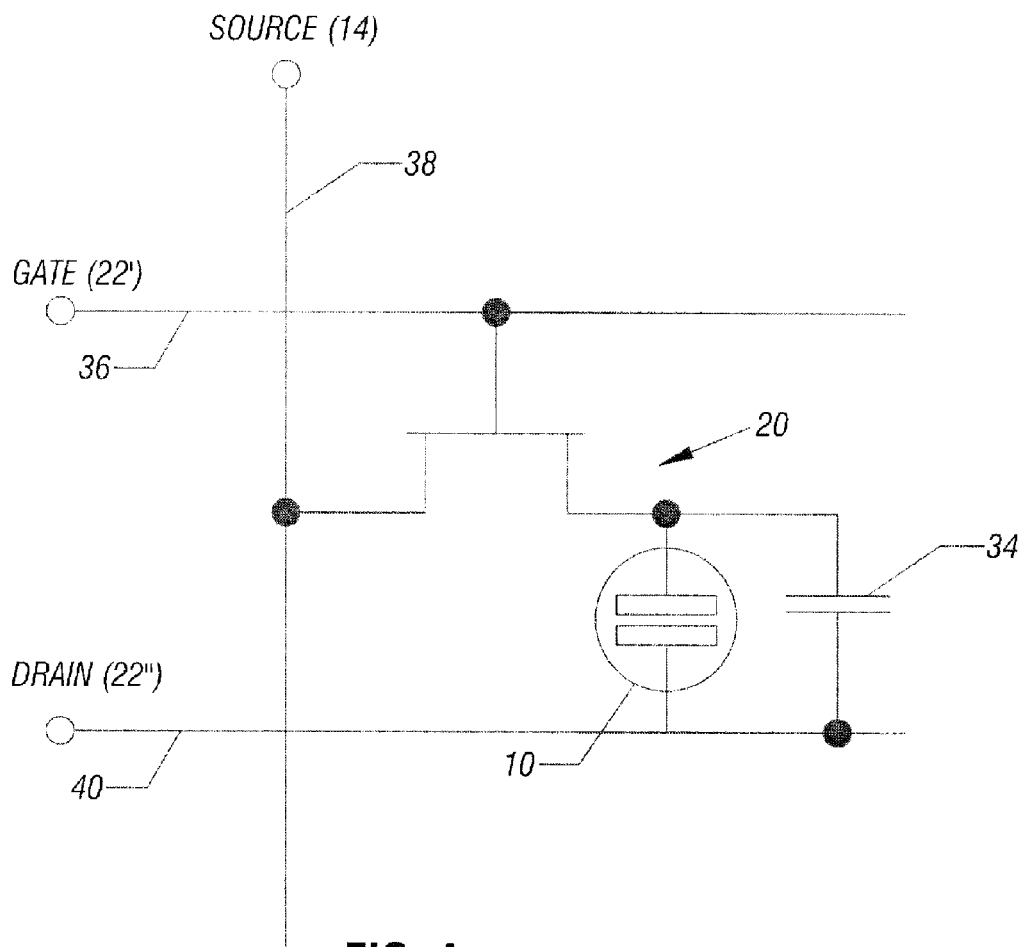
FIG. 4 is a diagram showing a bistable cholesteric display in an active matrix display arrangement, in accordance with one embodiment of the present invention.

Referring to FIG. 4, in one embodiment of the present invention, an active matrix display may be implemented. In such case, the material 20 may constitute a thin film transistor or other active element. In one embodiment, the gate 22' of the thin film transistor may be coupled to a line 36, that is in turn coupled to the electrode 22. At the same time, the source of the transistor 20 is coupled via line 38 to the electrode 14. The drain 22" may be coupled via a line 40 to an appropriate ground connection in one embodiment of the present invention. An external storage capacitor 34 may be provided in some embodiments.

Figure 5:
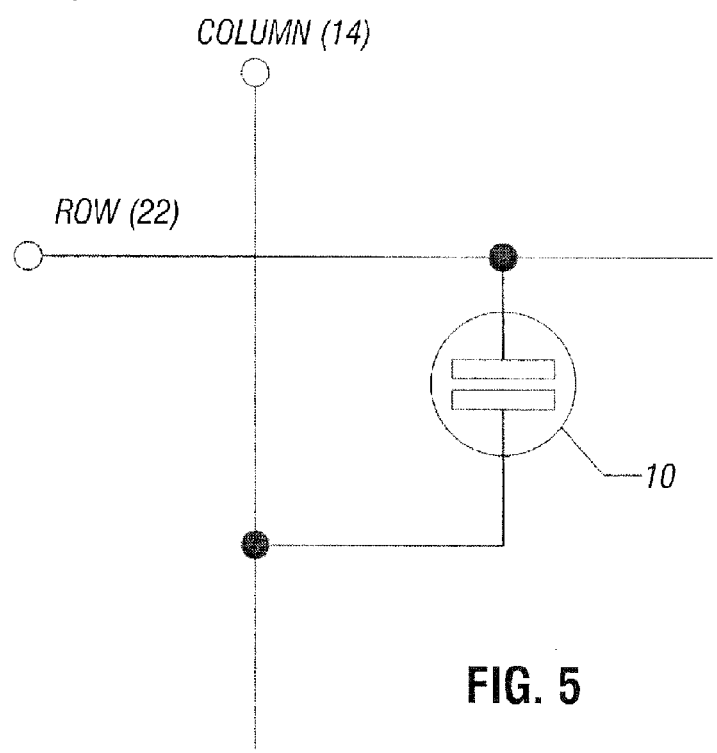
FIG. 5 is a bistable cholesteric display cell in a passive matrix display arrangement, in accordance with one embodiment of the present invention.

Similarly, in a passive matrix display embodiment, shown in FIG. 5, the electrode 14 may be coupled to a column potential and the electrode 22 may be coupled to a row potential. In such passive matrix addressing case, a thin film transistor is not needed to provide electrical addressing with row and column potentials on the material 20.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A cholesteric display comprising:
   a pair of first electrodes;
   a cholersteric material between the first electrodes; and
   second electrodes between the first electrodes to define three different light-color generating capabilities, wherein one of the second electrodes is common to two different light-color generating capabilities.

2. The cholesteric display of claim 1, wherein a first of the three different light-color generating capabilities has an opposed first electrode pair and an opposed second electrode pair.

3. The cholesteric display of claim 1, wherein a first (42a) of the three different light-color generating capabilities has an opposed first electrode pair (26b) and (26c) and an opposed second electrode pair (26a) and (26e).

4. The cholesteric display of claim 1, wherein a second of the three different light-color generating capabilities has an opposed first electrode pair and an opposed second electrode pair.

5. The cholesteric display of claim 1, wherein a second (42b) of the three different light-color generating capabilities has an opposed first electrode pair (26c) and (26d) and an opposed second electrode pair (26i) and (26f).

6. The cholesteric display of claim 1, wherein a third of the three different light-color generating capabilities has an opposed first electrode pair and an opposed second electrode pair.

7. The cholesteric display of claim 1, wherein a third (42c) of the three different light-color generating capabilities has an opposed first electrode pair (26h) and (26f) and an opposed second electrode pair (26e) and (26g).

8. The cholesteric display of claim 1, wherein a first of the three different light-color generating capabilities is red.

9. The cholesteric display of claim 1, wherein a first of the three different light-color generating capabilities is green.

10. The cholesteric display of claim 1, wherein a first of the three different light-color generating capabilities is blue.

11. The cholesteric display of claim 1, wherein each electrode is coupled to a separate potential.

\* \* \* \* \*